US008704915B2

(12) United States Patent
Fujitani

(10) Patent No.: US 8,704,915 B2
(45) Date of Patent: Apr. 22, 2014

(54) INFORMATION PROCESSING APPARATUS WITH DIFFERENT SAVE DESTINATION FOR WIRELESS COMMUNICATION AND CONTROL METHOD THEREOF

(75) Inventor: Yohei Fujitani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 12/977,788

(22) Filed: Dec. 23, 2010

(65) Prior Publication Data

US 2011/0176008 A1    Jul. 21, 2011

(30) Foreign Application Priority Data

Jan. 15, 2010    (JP) ................................. 2010-007442

(51) Int. Cl.
*H04N 5/76*    (2006.01)

(52) U.S. Cl.
USPC .................. 348/231.99; 348/231.2; 710/212; 710/213

(58) Field of Classification Search
CPC .................... H04L 29/08549; H04L 29/08072
USPC .............................. 348/231.99; 710/212, 213
See application file for complete search history.

(56) References Cited

U.S. PATENT DOCUMENTS

| | | | | |
|---|---|---|---|---|
| 6,670,982 B2* | 12/2003 | Clough et al. | ............. | 348/14.02 |
| 7,071,975 B2* | 7/2006 | Myojo | ........................ | 348/231.9 |
| 7,340,275 B2* | 3/2008 | Hamamura | .................... | 455/557 |
| 7,423,637 B2* | 9/2008 | Boals et al. | .................... | 345/179 |
| 7,702,821 B2* | 4/2010 | Feinberg et al. | ................. | 710/13 |
| 7,769,867 B2* | 8/2010 | Fukuda | ........................ | 348/231.9 |
| 8,046,504 B2* | 10/2011 | Feinberg et al. | ................. | 710/33 |
| 2002/0159090 A1* | 10/2002 | Nobutani et al. | ............ | 358/1.15 |
| 2002/0174337 A1* | 11/2002 | Aihara | ........................ | 713/172 |
| 2003/0074179 A1* | 4/2003 | Ropo et al. | ...................... | 703/27 |
| 2005/0005041 A1* | 1/2005 | Lin et al. | ......................... | 710/62 |
| 2005/0055479 A1* | 3/2005 | Zer et al. | ......................... | 710/22 |
| 2005/0146612 A1* | 7/2005 | Ward et al. | .................. | 348/207.1 |
| 2008/0098134 A1* | 4/2008 | Van Acht et al. | ................ | 710/33 |
| 2009/0237513 A1* | 9/2009 | Kuwata et al. | ................ | 348/207.1 |
| 2010/0095026 A1* | 4/2010 | Nagai et al. | ..................... | 710/16 |
| 2010/0169548 A1* | 7/2010 | Kanda | ........................... | 711/103 |
| 2010/0277611 A1* | 11/2010 | Holt et al. | .................. | 348/231.2 |

FOREIGN PATENT DOCUMENTS

JP    2001-111884    4/2001

* cited by examiner

*Primary Examiner* — Roberto Velez
*Assistant Examiner* — Cynthia Segura
(74) *Attorney, Agent, or Firm* — Cowan, Liebowitz & Latman, P.C.

(57) ABSTRACT

When a connected recording medium has a wireless communication function, the save destination is changed to store received data in a save destination set for data transmitted from the recording medium by wireless communication. The save destination of data received from the connected recording medium having the wireless communication function can be set appropriately.

11 Claims, 9 Drawing Sheets

INFORMATION PROCESSING APPARATUS WITH DIFFERENT SAVE DESTINATION FOR WIRELESS COMMUNICATION AND CONTROL METHOD THEREOF

BACKGROUND OF THE INVENTION

1. Field of the Invention

The present invention relates to an information processing apparatus capable of connecting a recording medium having wireless and wired communication functions, and receiving data, and a control method thereof.

2. Description of the Related Art

Image data captured by an image capturing apparatus such as a digital camera is recorded on the built-in memory of the image capturing apparatus or a removable recording medium such as a memory card. When storing captured image data in an information processing apparatus such as a PC from the image capturing apparatus, the storage processing is generally executed as follows. First, the information processing apparatus and recording medium are connected by connecting the image capturing apparatus to the information processing apparatus using a cable, or removing a removable recording medium from the image capturing apparatus and inserting it into the memory card slot of the information processing apparatus or a memory card reader connected to the information processing apparatus. Then, the information processing apparatus accesses the recording medium, and stores image data recorded on the recording medium in, for example, the recording device of the information processing apparatus. Some applications, which run on the information processing apparatus, automatically copy image data to a preset save destination when the information processing apparatus and recording medium are connected.

Japanese Patent Laid-Open No. 2001-111884 discloses an image capturing apparatus, which has a wireless communication function and automatically transmits captured image data to an external device such as an information processing apparatus. This image capturing apparatus can store captured image data at a preset location (for example, folder) in an information processing apparatus without wired-connecting the image capturing apparatus, recording medium, and information processing apparatus.

There is also known a removable recording medium having the wireless communication function. With this recording medium, even an image capturing apparatus having no wireless communication function can store recorded image data at, for example, a preset location in an information processing apparatus by wireless connection, similar to an image capturing apparatus having the wireless communication function.

The removable recording medium having the wireless communication function can be wired-connected to an information processing apparatus by connecting the image capturing apparatus and information processing apparatus by using a memory card reader or the like, similar to the above-mentioned removable recording medium, or while keeping the recording medium inserted in the image capturing apparatus. Depending on the specifications of the recording medium, user settings, or the like, data which has not been transmitted to the information processing apparatus by wireless communication may exist in a removable recording medium having the wireless communication function. Such data may be unintentionally deleted unless it is separately transmitted to the information processing apparatus by wired connection.

However, a save destination where the removable recording medium having the wireless communication function stores data by wireless communication can be set independently of a save destination which is set by the information processing apparatus as the data save destination of a wired-connected recording medium. Thus, these save destinations are sometimes different from each other. In this case, even image data that have been captured on, for example, the same day or the same event may be stored in different save destinations depending on the connection method. As a result, the same image data may be stored at a plurality of locations, or related image data may be stored in different save destinations depending on the file type, complicating management of the image data.

SUMMARY OF THE INVENTION

The present invention has been made to overcome the conventional drawbacks. The present invention provides an information processing apparatus capable of appropriately setting the save destination of data received from a connected recording medium having the wireless communication function, and a control method thereof.

According to one aspect of the present invention, there is provided an information processing apparatus having a communication unit configured to store data received from a connected external device in a first save destination, the apparatus comprising: a decision unit configured to decide whether the external device connected to the communication unit has a recording medium having a wireless communication function; and a control unit configured to control a save destination of data received by the communication unit from the external device, wherein when the decision unit decides that the external device has the recording medium having the wireless communication function, the control unit acquires information of a second save destination for storing data transmitted by the wireless communication function from the recording medium having the wireless communication function in the external device, and stores data received by the communication unit from the external device in the second save destination.

Further features of the present invention will become apparent from the following description of exemplary embodiments (with reference to the attached drawings).

DESCRIPTION OF THE EMBODIMENTS

Illustrative embodiments of the present invention will be described in detail below with reference to the accompanying drawings. The following embodiments will describe an example in which the present invention is applied to a digital camera serving as an example of an image capturing apparatus, and a PC serving as an example of an information processing apparatus.

First Embodiment

Figure 1:
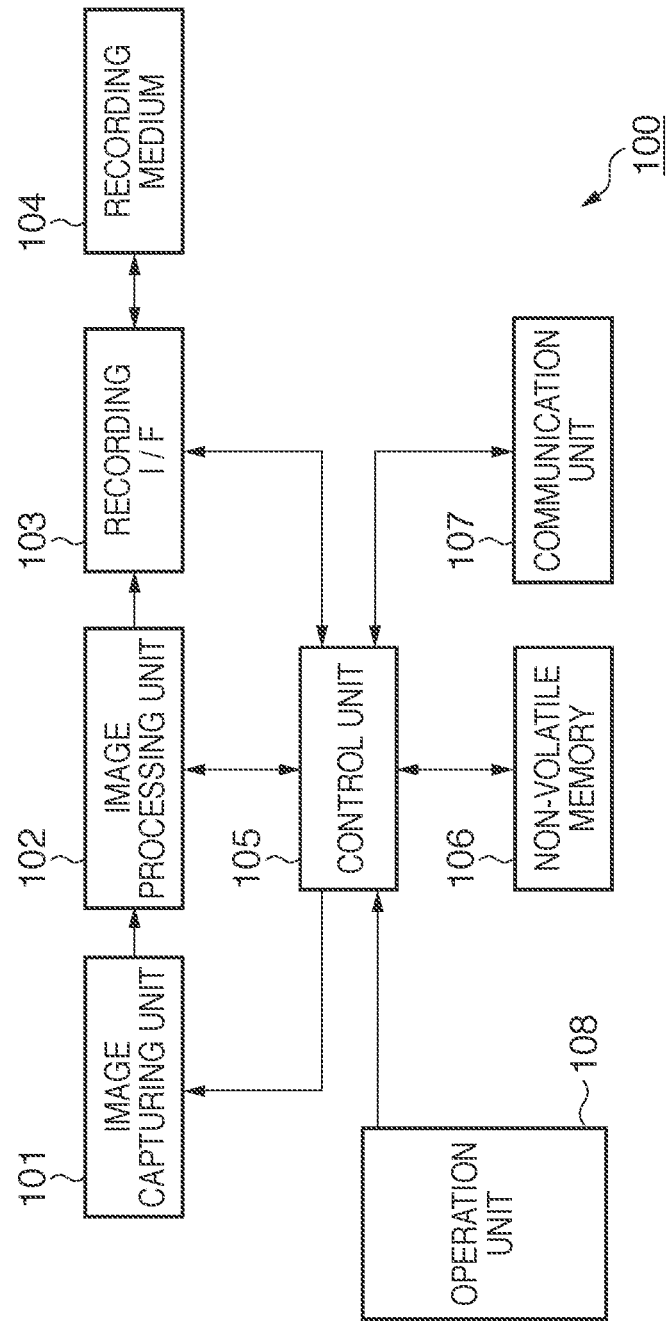
FIG. 1 is a block diagram exemplifying the functional arrangement of a digital camera serving as an example of an image capturing apparatus according to an embodiment of the present invention.

FIG. 1 is a block diagram showing the functional arrangement of a digital camera common to the first to third embodiments of the present invention. In a digital camera 100, an operation unit 108 is an interface for accepting an input from the user, and includes a shutter button, mode switching button, and the like. An instruction input from the operation unit 108 is transferred to a control unit 105, and the control unit 105 controls the operation of each block in the digital camera 100 based on the instruction. The control unit 105 can be, for example, a CPU. The control unit 105 operates each block by expanding, in a RAM (not shown) or the like, the operation program of the block that is stored in a non-volatile memory 106, and executing the operation program. The non-volatile memory 106 can be a storage device such as a ROM. The non-volatile memory 106 stores parameters necessary to operate each block, information (image information) of a recording medium 104, various settings, GUI data, and the like, in addition to the above-mentioned operation program. The image information includes the total number of image data in the recording medium 104, the file name, information indicating whether the recording medium 104 has the wireless communication function, and the current recording file format of the digital camera 100. The image information also includes information (for example, the thumbnail image of image data) which allows the PC to grasp the states of the recording medium 104 and digital camera 100.

When the control unit 105 receives an image capturing instruction from the user via the shutter button of the operation unit 108, it controls an image capturing unit 101 to execute image capturing processing. The image capturing unit 101 captures an object image, applies processing such as A/D conversion to captured data obtained from an image sensor (not shown), and transmits image data obtained by conversion to an image processing unit 102. The image processing unit 102 applies, for example, white balance control processing, color tone adjustment processing, and resolution conversion processing to the received image data, and outputs the obtained image data to a recording I/F 103. The recording I/F 103 records the received image data on the recording medium 104. The recording I/F 103 is an interface which changes depending on the recording medium 104, and can be a memory card slot, USB terminal, or the like. The recording medium 104 is a removable memory card having the wireless communication function in the first embodiment. The recording medium 104 may incorporate a power supply for wireless connection by the recording medium 104, or the digital camera 100 may supply power via the recording I/F 103.

In the first embodiment, whether the recording medium 104 has the wireless communication function can be detected by, for example, intercommunication between the control unit 105 and the recording medium 104 via the recording I/F 103. For example, the control unit 105 acquires device information of the recording medium 104 or refers to device information contained in data stored in the recording medium 104, thereby determining whether the recording medium 104 has the wireless communication function. However, the method of detecting whether the recording medium has the wireless communication function depends on the specifications of the recording medium 104 and the like, and thus is not limited to the above method.

A communication unit 107 can be a connection interface when wired-connecting the digital camera 100 and PC. The communication unit 107 is assumed to be, for example, a connector for a USB cable or IEEE1394 cable. In the first embodiment of the present invention, when the digital camera 100 is wired-connected to an external device such as a PC via the communication unit 107, the control unit 105 activates an image transmission program.

Figure 2:
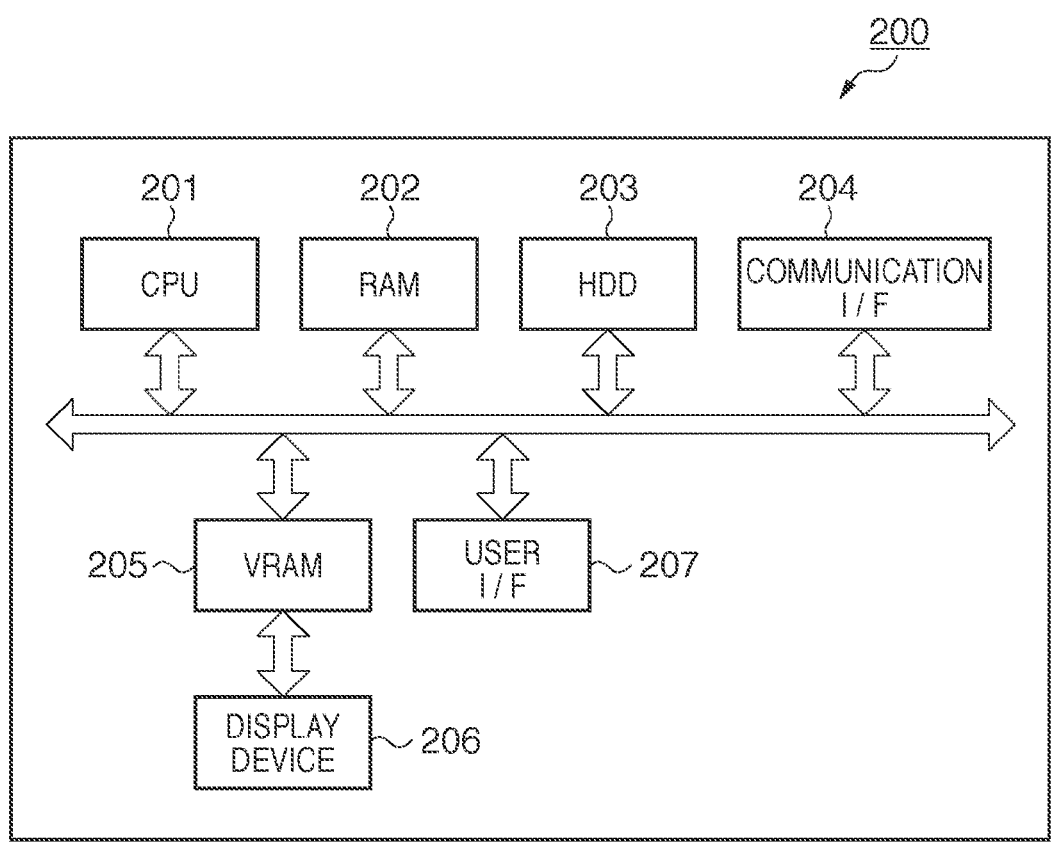
FIG. 2 is a block diagram exemplifying the functional arrangement of a PC serving as an example of an information processing apparatus according to the embodiment.

FIG. 2 is a block diagram showing the functional arrangement of a PC common to the first to third embodiments of the present invention. In a PC 200, a CPU 201 controls the operation of each block of the PC. The CPU 201 expands, in a RAM 202, the operation program of each block that is stored in a ROM (not shown), an HDD 203 (to be described later), or the like, and executes the operation program. The RAM 202 is used as a data save area not only when the CPU 201 expands the operation program of each block, but also when the CPU 201 processes an error generated during execution of the operation program. The RAM 202 is also used as a temporary data save destination when the PC is connected to an external device or recording medium. The HDD 203 stores the operation program of each block of the PC 200, and in addition, image data and various applications such as an image transmission program.

A communication I/F 204 is a connection interface for wired- or wirelessly-connecting the PC 200 and an external device. The wired connection interface of the communication I/F 204 is, for example, a connector for a USB cable or IEEE1394 cable, and its wireless connection interface is, for example, a transmitter/receiver complying with the communication standard such as IEEE 801.11b/g/n.

A VRAM 205 is a video signal output device such as a graphic card, and outputs video signals such as image data or the GUIs of various applications which are stored in the HDD 203 and are to be displayed on a display device 206 connected to the PC 200. The display device 206 is, for example, an LCD, and displays a video signal output from the VRAM 205 on a display unit (not shown) after applying processing such as luminance control.

A user I/F 207 is an input interface for accepting an input from the user to the PC 200, and includes, for example, a mouse and keyboard. The user I/F 207 allows, for example, the GUI operations of various applications stored in the HDD 203, and command input to the PC 200.

Figure 3:
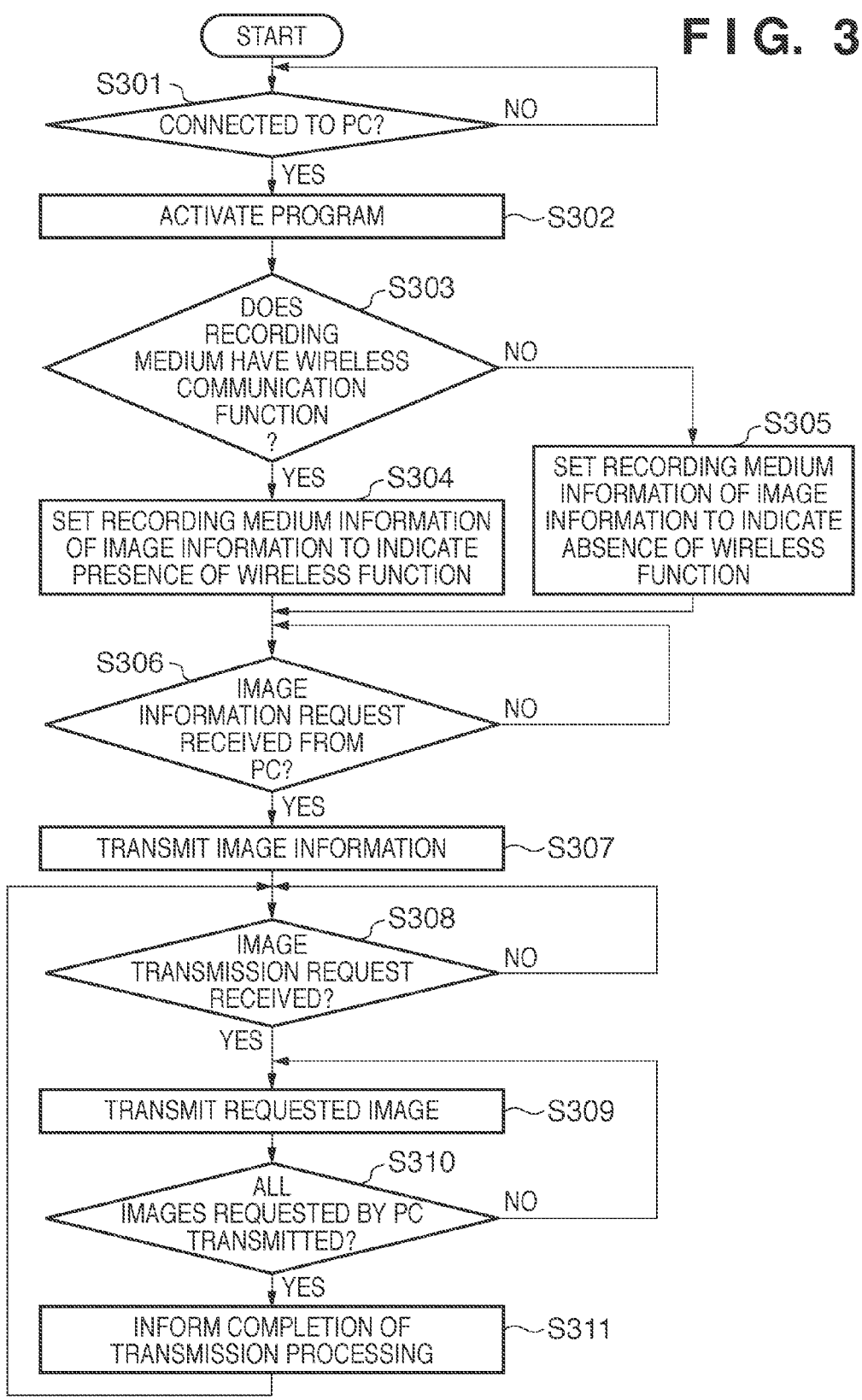
FIG. 3 is a flowchart for explaining image transmission processing by the digital camera according to the first embodiment.
Figure 4:
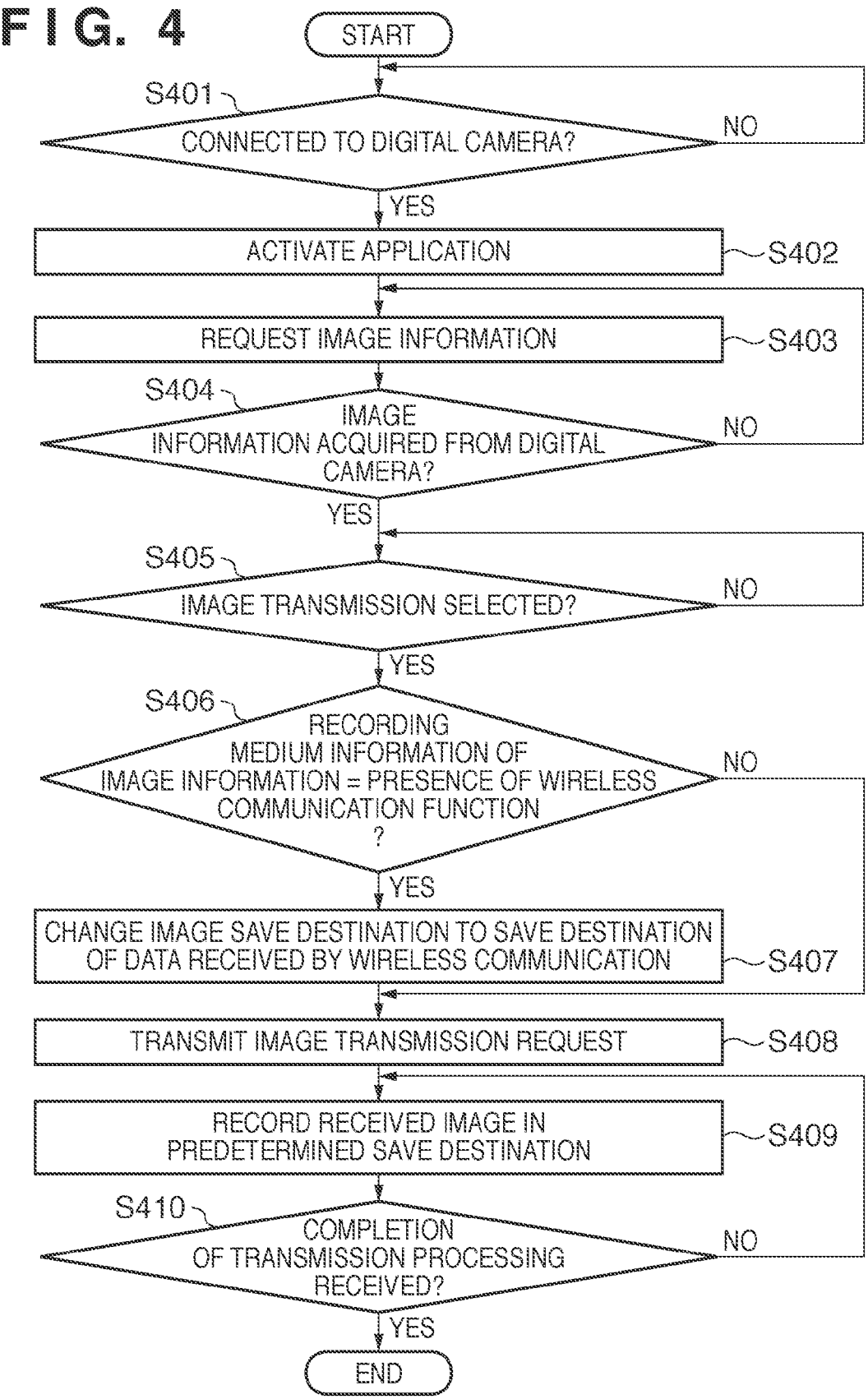
FIG. 4 is a flowchart for explaining image reception processing by the PC serving as an example of the information processing apparatus according to the first embodiment.

Image transmission processing executed between the digital camera 100 and the PC 200 in the first embodiment having the above-described arrangement will be explained with reference to the flowchart of processing by the digital camera 100 shown in FIG. 3 and that of processing by the PC 200 shown in FIG. 4.

(Processing on Digital Camera Side)

In step S301, the control unit 105 monitors connection to the communication unit 107. If the PC 200 is wired-connected to the communication unit 107, the control unit 105 reads out an image transmission program from the non-volatile memory 106, and activates it (step S302).

In step S303, the control unit 105 transmits a command to the recording medium 104 via, for example, the recording I/F 103, and determines whether the recording medium 104 has the wireless communication function.

If the recording medium 104 has the wireless communication function, the control unit 105 sets recording medium information contained in image information in the non-volatile memory 106 to indicate the presence of the wireless communication function (step S304). If the recording medium 104 does not have the wireless communication function, the control unit 105 sets recording medium information contained in image information to indicate the absence of the wireless communication function (step S305).

If the digital camera 100 receives an image information request from the PC 200 via the communication unit 107 in step S306, the control unit 105 reads out image information from the non-volatile memory 106, and transmits (wired-communicates) it to the PC 200 by wired connection via the communication unit 107 (step S307).

If the digital camera 100 receives an image transmission request from the PC 200 in step S308, the control unit 105 transmits image data, transmission of which is requested, to the PC 200 by wired connection (step S309). The control unit 105 checks whether all image data, transmission of which is requested, have been transmitted to the PC 200 (step S310). If untransmitted image data remains, the control unit 105 repetitively executes step S309. After the end of transmitting all requested image data, the control unit 105 informs the PC 200 by wired connection of the completion of the transmission processing (step S311). After informing the completion of the transmission processing, the control unit 105 waits for an image transmission request from the PC 200 again in step S308 until the connection with the PC 200 is canceled.

(Processing on PC Side)

If the CPU 201 detects in step S401 that the digital camera 100 and PC 200 are wired-connected, it reads out an image transmission application according to the first embodiment of the present invention from the HDD 203, and activates it in order to store an image from the digital camera 100 (step S402).

After activating the image transmission application, the CPU 201 transmits an image information request by wired connection in step S403 in order to read image data information and the like which are recorded on the recording medium 104 mounted in the digital camera 100. In step S404, the CPU 201 determines whether acquisition of the image information requested in step S403 has been completed. If NO in step S404, the CPU 201 repeats processing until acquisition of the image information is completed. The CPU 201 parallelly displays, for example, in an application window, information of the thumbnail images of image data recorded on the recording medium 104, which is contained in the acquired image information, thereby presenting the image data to the user.

The CPU 201 determines whether the user has selected image data to be transmitted from the image data recorded on the recording medium 104, and has selected the start of processing to transmit the image (step S405).

In step S406, the CPU 201 determines whether recording medium information in the image information is the "presence of the wireless communication function", that is, recording medium information in the image information indicates a recording medium having the wireless communication function.

If recording medium information in the image information is the "presence of the wireless communication function", the CPU 201 changes the image save destination of the image transmission application to a save destination set for data received by wireless connection in step S407. Information of the save destination of data received by wireless connection may be acquired, for example, by referring to the settings of a PC application which stores data received by wireless connection from a recording medium having the wireless communication function, or from the recording medium 104 if the recording medium 104 holds save destination information. When acquiring save destination information from the recording medium, for example, the control unit 105 of the digital camera 100 may acquire save destination information for wireless connection that is contained in the recording medium 104, and transmit it as image information to the PC 200. When the device information, file, or the like of the recording medium 104 contains save destination information, the control unit 105 suffices to acquire the device information, file, or the like from the recording medium 104, refer to save destination information, and inform the PC 200 of it. The control unit 105 may acquire save destination information by transmitting a predetermined command to the recording medium 104. Alternatively, the CPU 201 may display, on the image transmission application, a dialog which prompts the user to designate an image save destination from a save destination list or designate an arbitrary save destination, and may determine and change the save destination. In this case, for example, when there is information of a save destination where data received by wireless connection has already been stored, this save destination is displayed at the top of the save destination list.

If recording medium information in the image information is the "absence of the wireless communication function", the CPU 201 selects a normal (wired connection) save destination set in the image transmission application without changing the image save destination of the image transmission application.

When changing the save destination, for example, the CPU 201 may inform the display device 206 of it, in order to notify the user of change of the save destination and information of a save destination selected by the change. Accordingly, the user can easily search for a stored image even when the save destination is changed.

Upon completion of setting the save destination, the CPU 201 transmits an image transmission request to the digital camera 100 by wired connection, and starts reception processing in step S408. After the start of the reception processing, the CPU 201 stores image data received at any time in the set save destination (step S409). The CPU 201 repeats the image data storage processing until all images, transmission of which is requested, are transmitted (step S410). In the storage processing, the CPU 201 compares image data recorded in the save destination of data received by wireless connection with information of image data recorded on the recording medium 104 that is contained in the acquired image information of the recording medium 104. If the same image data exists in both the save destination of data received by wireless connection and the recording medium 104, the CPU 201 determines that, for example, the image data has already been received, and does not issue a transmission request. Alternatively, the CPU 201 may compare a file name contained in the image information with the file name of the save destination, and need not display a thumbnail image for the same image data. When the image information contains information indicating whether each data has been transmitted by the wireless communication function, no thumbnail image need be displayed for data which has already been transmitted by the wireless communication function. In this case, a transmission request for the same image data (already stored image data) is not generated, reducing unnecessary reception. If the CPU 201 receives the completion of transmission processing from the digital camera 100 in step S410, it determines that all images, transmission of which is requested, have been transmitted, and ends the image transmission processing.

Note that the first embodiment has described image transmission processing when a recording medium having the wireless communication function is mounted in the digital camera 100 and wired-connected to the PC 200. However, the form of wired connection to the PC 200 is not limited to this. For example, when the recording medium 104 is a memory card, it may be mounted in a readable memory card reader and wired-connected to the PC 200. When the recording medium 104 is an HDD, it may be directly wired-connected to the PC 200. In this case, the image transmission application determines the connected recording medium 104 without determining by the digital camera 100 whether the recording medium 104 has the wireless communication function, and informing the image transmission application running on the PC 200 of it. Note that the PC 200 may incorporate the memory card reader.

Note that the first embodiment has described a case in which the removable recording medium 104 having the wireless communication function is wired-connected to the PC 200. However, the practice of the present invention is not limited to this. More specifically, when a wired- or wireless-connected external device has the recording medium 104 having the wireless communication function, the PC 200 changes the data save destination from a normal save destination to the save destination of data transmitted by wireless communication from the recording medium 104 having the wireless communication function. In the first embodiment, the PC 200 stores data received from the recording medium 104 having the wireless communication function in a save destination within the HDD 203. However, the save destination of data from the recording medium 104 having the wireless communication function need not be the storage device of the connected PC 200, and may be an arbitrary storage device (for example, a network server) wired- or wireless-connected to the PC 200.

As described above, when a removable recording medium having the wireless communication function is wired-connected to the information processing apparatus according to the present invention, the information processing apparatus changes the save destination of data received by wired connection to be the same as a save destination set for data received by wireless connection from the recording medium. Thus, even when an application which stores data received by wireless connection from a recording medium having the wireless communication function is different from an application which stores data received by wired connection, the information processing apparatus can store received data in the same save destination regardless of the connection method. This can prevent storing the same data repetitively at different locations, or storing related data at different locations.

Second Embodiment

The second embodiment of the present invention will be described below.

The second embodiment pertains to image transmission processing when a digital camera 100 captures an image while the digital camera 100 in which a recording medium having the wireless communication function is mounted is wired-connected to a PC 200. The second embodiment assumes that the recording medium having the wireless communication function is set to automatically transmit recorded image data to the PC 200 by wireless communication when it falls within a range capable of wirelessly communicating with the PC 200. Also, the second embodiment assumes that the recording medium having the wireless communication function resides within a range capable of wirelessly communicating with the PC 200 while the digital camera 100 and PC 200 are wired-connected.

Note that the second embodiment is the same as the first embodiment except for the contents of image transmission processing, so only the image transmission processing will be explained.

Image transmission processing executed between the digital camera 100 and the PC 200 in the second embodiment will be explained with reference to the flowchart of processing by the digital camera 100 shown in FIGS. 5A and 5B and that of processing by the PC 200 shown in FIG. 6.

Figure 5A:
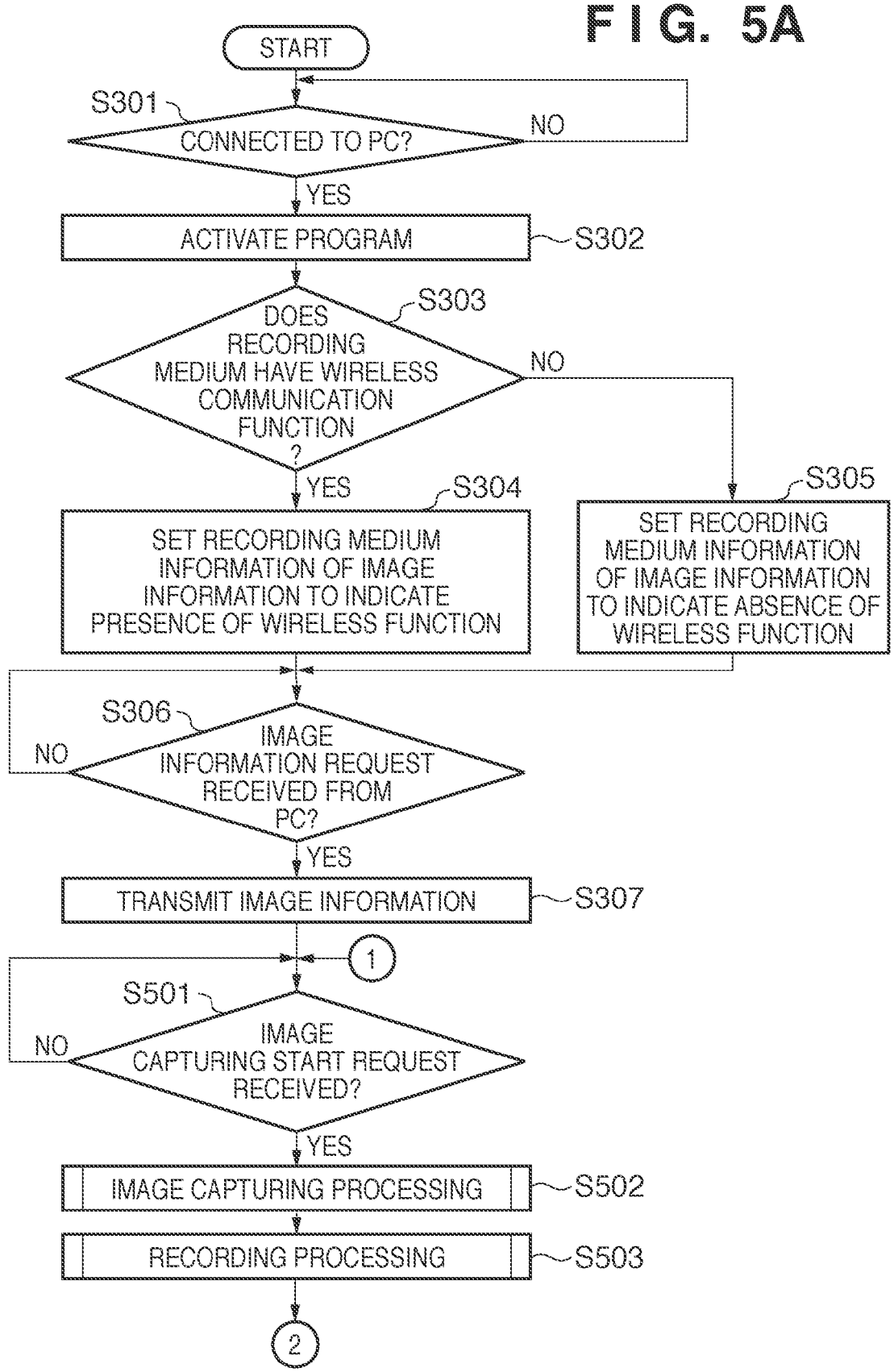
FIGS. 5A and 5B are flowcharts for explaining image transmission processing according to the second embodiment.
Figure 5B:
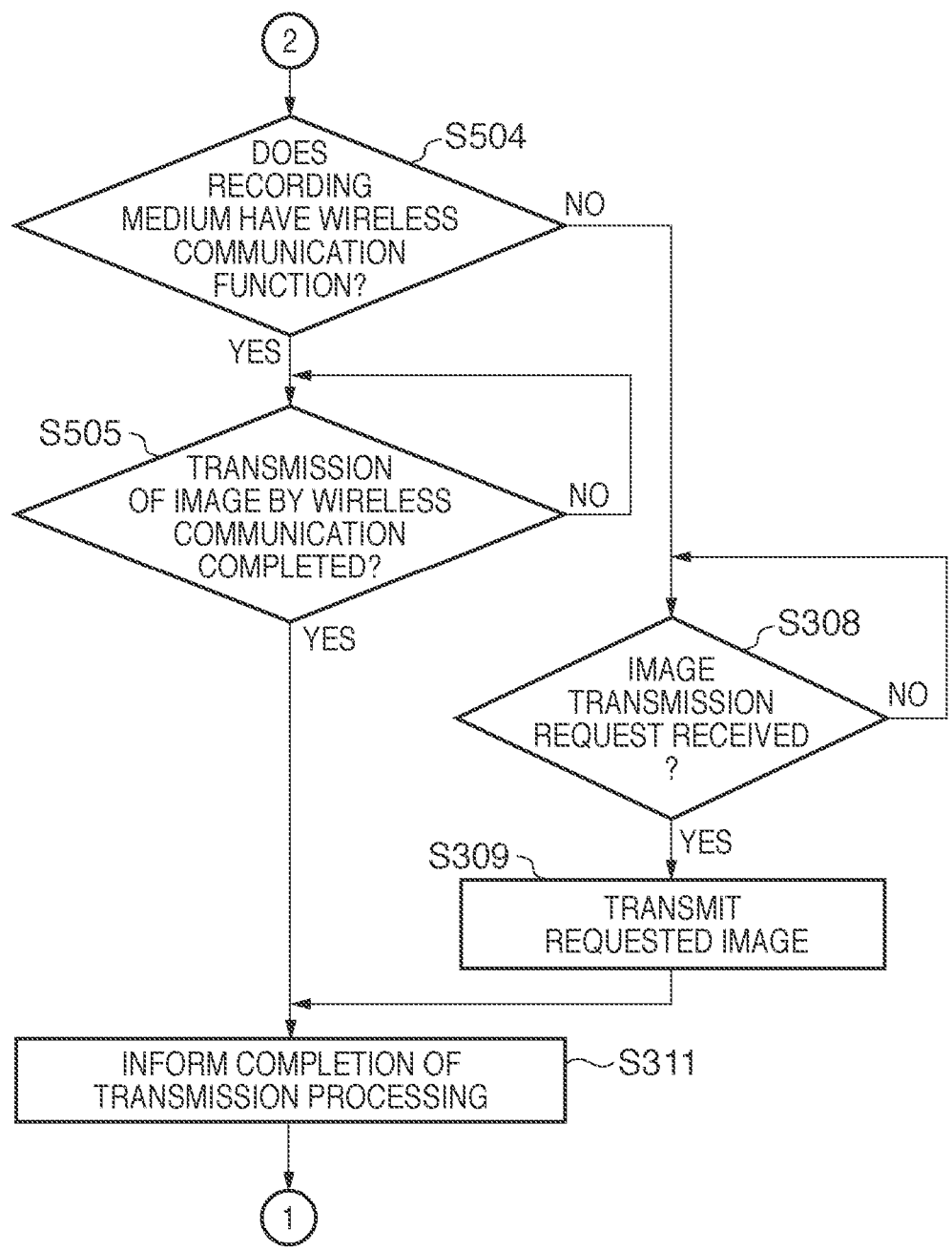
Figure 6:
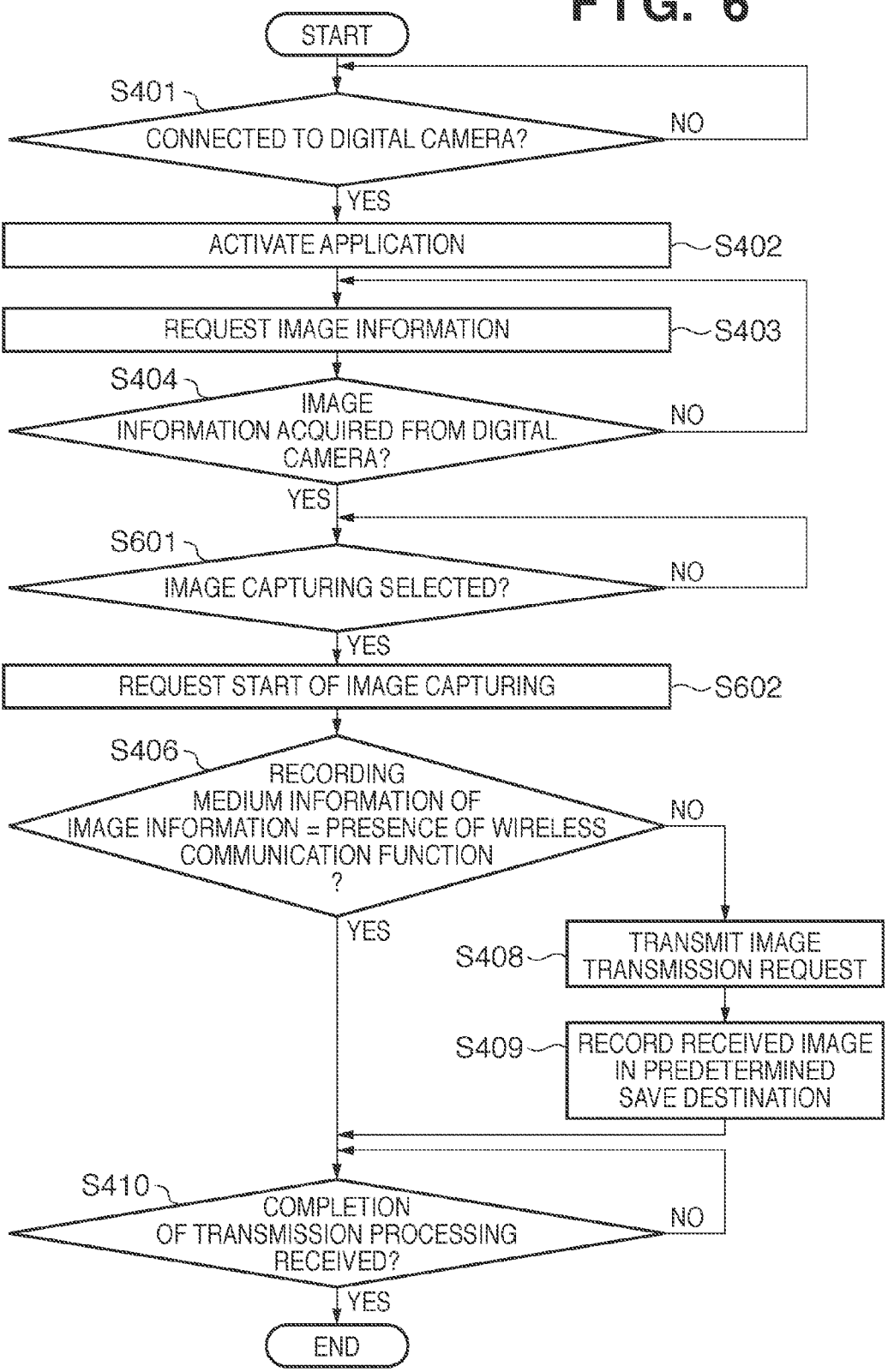
FIG. 6 is a flowchart for explaining image reception processing according to the second embodiment.

In FIGS. 5A, 5B and 6, the same reference numerals as those in FIGS. 3 and 4 in the first embodiment denote the steps of the same processes, a description thereof will not be repeated, and only characteristic steps in the second embodiment will be explained.

(Processing on Digital Camera Side)

If a control unit 105 receives an image capturing start request to the digital camera 100 from the PC 200 in step S501 after transmitting image information to the PC 200 in step S307, it starts image capturing processing (step S502). The image capturing start request is designated by the user via, for example, the image transmission application of the wired-connected PC 200, and transmitted to the control unit 105 of the digital camera 100 via the communication unit 107. The control unit 105 records image data captured by the image capturing processing on a recording medium 104 in step S503 (recording processing).

In step S504, the control unit 105 determines whether the recording medium 104 has the wireless communication function.

If the recording medium 104 has the wireless communication function, it automatically transmits image data to the PC 200 by wireless connection. The control unit 105 monitors transmission processing of the recording medium 104, and determines whether transmission of image data by wireless connection has been completed (step S505). For example, the control unit 105 suffices to inquire the communication state by periodically transmitting a command to the recording medium 104, and monitor, based on a response to the command, whether transmission of data has been completed.

If the recording medium 104 does not have the wireless communication function, the control unit 105 transmits, by wired connection in response to an image transmission request from the PC 200, image data which has been captured and recorded on the recording medium 104 (steps S308 and S309).

Upon completion (wired or wireless connection) of transmitting image data which has been captured by the digital camera 100 and recorded on the recording medium 104, the control unit 105 informs the PC 200 of the completion of the transmission processing in step S311.

(Processing on PC Side)

If the user selects the image capturing function as a function of the image transmission application in step S601 after receiving image information from the digital camera 100 in step S404, a CPU 201 transmits an image capturing start request to the digital camera 100 in step S602. The image capturing start request may contain an image capturing instruction, and parameters necessary to record image data, such as the recording file format and recording image resolution setting, to update the settings of the digital camera 100 and perform image capturing processing. The parameters necessary to record image data may be those set in the digital camera 100. In this case, the image capturing start request need not contain parameters necessary to record image data.

The CPU 201 determines that new image data has been written in the recording medium 104 by image capturing processing of the digital camera 100 in response to transmission of the image capturing start request to the digital camera 100. The CPU 201 then executes the following image transmission processing.

In the second embodiment, whether new image data has been written in the recording medium 104 is determined by the CPU 201 by transmitting an image capturing start request to the digital camera 100, but may be determined by another method. For example, while the digital camera 100 and PC 200 are wired-connected, the control unit 105 suffices to periodically transmit a command to the recording medium 104, determine whether new image data has been written in the recording medium 104, and transmit the information to the PC 200.

In step S406, the CPU 201 determines whether recording medium information contained in received image information is the "presence of the wireless communication function". If recording medium information is the "presence of the wireless communication function" (that is, normal recording medium), the CPU 201 transmits, to the digital camera 100 by wired connection, an image transmission request to acquire image data captured in response to the image capturing request transmitted in step S602 (step S408). The CPU 201 stores image data transmitted by wired connection from the digital camera 100 in a save destination set in the image transmission application (step S409).

If the CPU 201 receives the completion of transmission processing from the digital camera in step S410 regardless of whether the storage processing has been done by wired or wireless connection, it ends the image transmission processing.

In this manner, when a recording medium having the wireless communication function is mounted in the digital camera and wired-connected, the information processing apparatus according to the second embodiment does not acquire an image by wired connection. This can prevent acquiring again, by wired connection, image data which has been automatically transmitted by wireless connection from a recording medium having the wireless communication function.

Third Embodiment

The third embodiment of the present invention will be described below.

The third embodiment pertains to image transmission processing when the data format capable of automatic transmission from a recording medium having the wireless communication function is limited in the second embodiment.

Image transmission processing executed between a digital camera 100 and a PC 200 in the third embodiment will be explained with reference to the flowchart of processing by the digital camera 100 shown in FIG. 7 and that of processing by the PC 200 shown in FIG. 8.

Figure 7:
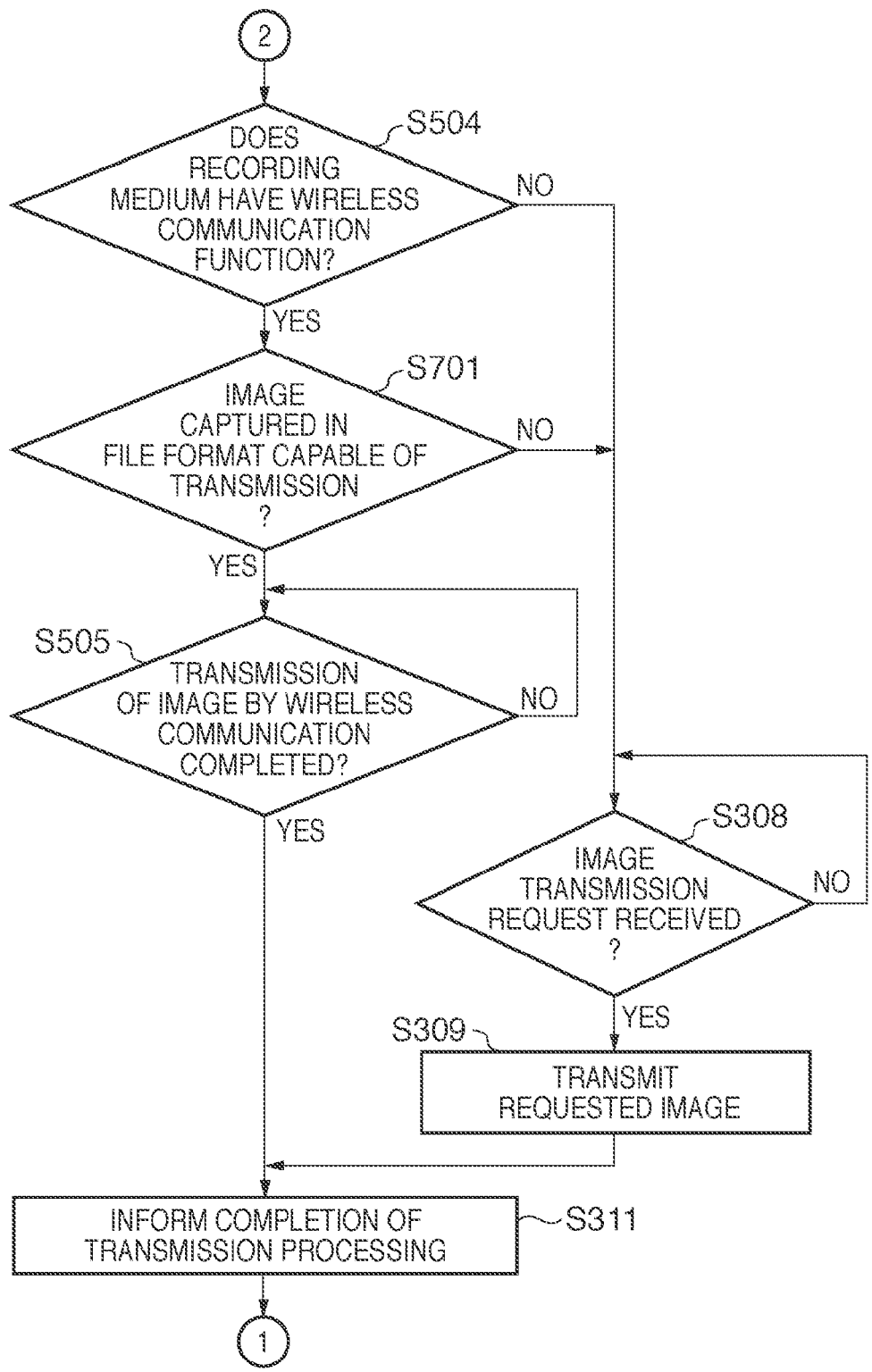
FIG. 7 is a flowchart for explaining image transmission processing according to the third embodiment.
Figure 8:
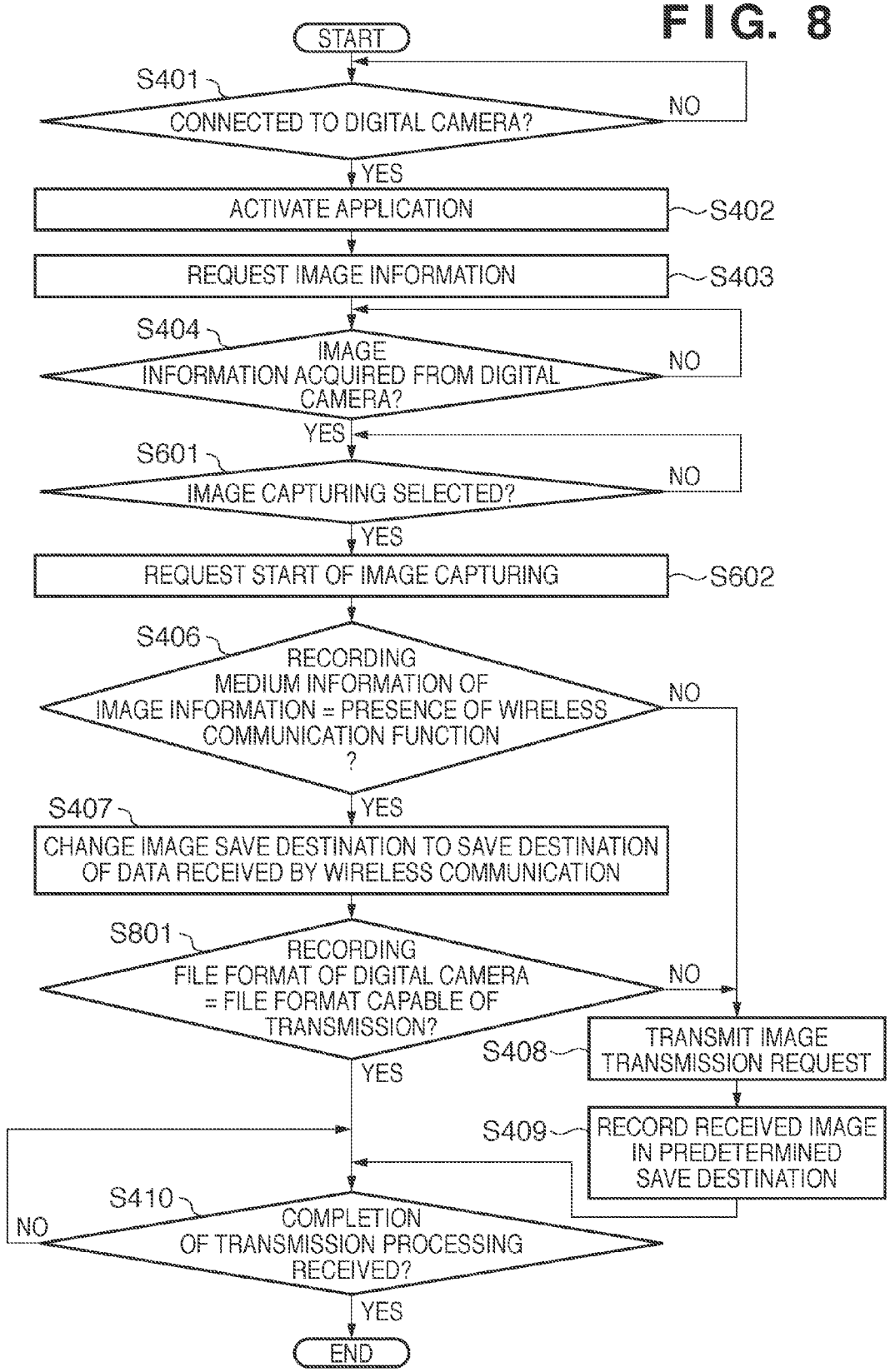
FIG. 8 is a flowchart for explaining image reception processing according to the third embodiment.

In FIGS. 7 and 8, the same reference numerals as those in FIGS. 3 to 6 in the first and second embodiments denote the steps of the same processes, a description thereof will not be repeated, and only characteristic steps in the third embodiment will be explained.

(Processing on Digital Camera Side)

If a control unit 105 determines in step S504 that a recording medium 104 has the wireless communication function, it further determines in step S701 whether the recording file format of captured image data is a file format set for transmission by wireless connection from the recording medium 104.

If the recording file format of captured image data is a file format capable of transmission by wireless connection, the control unit 105 does not perform image transmission processing by wired connection, similar to the second embodiment. At this time, the recording medium 104 transmits image data to the PC 200 by wireless connection, and the transmitted image data is stored in a data save destination set for wireless connection. If the recording file format of captured image data is not a file format set for transmission by wireless connection, image data is transmitted by wired connection even when the recording medium 104 has the wireless communication function (steps S308 and S309).

(Processing on PC Side)

If a CPU 201 determines in step S406 that recording medium information contained in image information is the "presence of the wireless communication function", it changes the image data save destination of the image transmission application to a save destination set for data received by wireless connection in step S407.

In step S801, the CPU 201 determines whether recording file format information contained in image information indicates a file format capable of transmission from a recording medium having the wireless connection function.

If the recording file format is a file format for automatic transmission by wireless connection, the CPU 201 suspends processing until it receives the completion of transmission processing in step S410, without performing image transmission processing, similar to the second embodiment. If the recording file format is a file format not for automatic transmission by wireless connection, the CPU 201 receives image data by wired connection (steps S408 and S409).

In the processing by the PC 200 according to the second and third embodiments, the image transmission application of the PC 200 transmits an image capturing start request. Then, the CPU 201 determines that new image data has been written in the recording medium 104, and executes image transmission processing in subsequent steps. However, when the image transmission application has a function of detecting that new image data has been written in the recording medium 104, the image transmission processing in the present invention is applicable to even image data captured by pressing the shutter button of the digital camera 100 upon wired connection. Even when the digital camera 100 detects that new image data has been written in the recording medium 104, and informs the PC 200 of that event, the image transmission processing in the present invention is applicable in the same way.

As described above, according to the third embodiment, the following processing is done. When the recording file format of captured image data is not a file format capable of automatic transmission by wireless connection, even if the recording medium has the wireless communication function, image data is acquired by wired connection and stored at the same save destination as that of image data received by wireless connection. When the recording file format is a format capable of automatic transmission by wireless connection, image data is received by wireless connection. The third embodiment can, therefore, implement the same effects as those of the first and second embodiments.

In the first to third embodiments described above, when a recording medium having the wireless communication function is wired-connected, the save destination of image data received from the recording medium is switched not to a save destination for wired connection, but to a save destination for automatic transmission by wireless connection. However, the practice of the present invention is not limited to this, and image data received from a recording medium having the wireless communication function may be automatically stored in both a save destination for automatic transmission by wireless connection and one for wired connection. With this setting, the user can view an image he wants, by referring to the save destination for wired connection even if he does not recognize whether the recording medium has the wireless communication function.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-007442, filed Jan. 15, 2010, which is hereby incorporated by reference herein in its entirety.

What is claimed is:

1. An information processing apparatus having a communication unit configured to receive data from a connected external device via a communication interface of the external device, the apparatus comprising:
   a decision unit configured to decide whether a recording medium included in the external device comprises a wireless communication unit that is a different communication interface from the communication interface of the external device; and
   a control unit configured to control a save destination of data received by the communication unit from the external device via the communication interface,
   wherein in a case where said decision unit decides that the recording medium does not comprise the wireless communication unit, said control unit stores data received by the communication unit from the external device in a pre-determined first save destination, and
   in a case where said decision unit decides that the recording medium comprises the wireless communication unit, said control unit acquires information of a second save destination, which is different from the first save destination, for storing data transmitted by the wireless communication unit from the recording medium, and stores data received by the communication unit from the external device in the second save destination, not the first save destination.

2. The apparatus according to claim 1, further comprising a determination unit configured to, in a case where said decision unit decides that the recording medium comprises the wireless communication unit, determine whether data recorded on the recording medium comprising the wireless communication unit has already been transmitted by the wireless communication unit,
   wherein the communication unit receives the data by issuing a transmission request for data to the external device and does not issue the transmission request to the external device for data which is determined by said determination unit to have already been transmitted by the wireless communication unit.

3. The apparatus according to claim 2, wherein said determination unit compares information of data stored in the second save destination with information of data recorded on the recording medium comprising the wireless communication unit, and determines whether data recorded on the recording medium comprising the wireless communication unit has already been transmitted by the wireless communication unit.

4. The apparatus according to claim 2, wherein said determination unit refers to information which is contained in data recorded on the recording medium comprising the wireless communication unit and indicates whether the data has already been transmitted by the wireless communication unit, and determines whether the data recorded on the recording medium comprising the wireless communication unit has already been transmitted by the wireless communication unit.

5. The apparatus according to claim 1, wherein
   the communication unit receives the data by issuing a data transmission request to the external device, and
   in a case where a data format cannot be transmitted by the wireless communication unit is set, the communication unit requests the external device to transmit data of the data format incapable of transmission among data recorded on the recording medium comprising the wireless communication unit.

6. The apparatus according to claim 1, wherein in a case where data received from the external device contains information indicating that a recording medium which records the received data is a recording medium comprising the wireless communication unit, said decision unit decides that the recording medium comprises the wireless communication unit.

7. The apparatus according to claim 1, wherein the external device is an image capturing apparatus or a memory card reader.

8. A method of controlling an information processing apparatus having a communication unit configured to receive data from a connected external device via a communication interface of the external device, the method comprising:
   a decision step for deciding whether a recording medium included in the external device comprises a wireless communication unit that is a different communication interface from the communication interface of the external device; and
   a control step for controlling a save destination of data received by the communication unit from the external device via the communication interface,
   wherein in the control step, in a case where it is decided that the recording medium does not comprise the wireless communication unit in the decision step, a control unit stores data received by the communication unit from the external device in a pre-determined first save destination, and
   in a case where, in said decision step, it is decided that the recording medium comprises the wireless communication unit, said control unit controls to acquire information of a second save destination, which is different from the first save destination, for storing data transmitted by the wireless communication unit from the recording medium, and store data received by the communication unit from the external device in the second save destination, not the first save destination.

9. An information processing apparatus having a communication unit configured to receive data from a recording medium, the apparatus comprising:
- a decision unit configured to decide whether the recording medium comprises a wireless communication unit; and
- a control unit configured to control a save destination of data received by said communication unit from the recording medium,
- wherein in a case where said decision unit decides that the recording medium does not comprise the wireless communication unit, said control unit stores data, of which said communication unit receives from the recording medium without using the wireless communication unit, in a pre-determined first save destination, and
- in a case where said decision unit decides that the recording medium comprises the wireless communication unit, said control unit acquires information of a second save destination, which is different from the first save destination, for storing data transmitted by the wireless communication unit from the recording medium, and stores data, of which said communication unit receives from the recording medium without using the wireless communication unit, in the second save destination, not the first save destination.

10. The apparatus according to claim 9, wherein said communication unit receives data by wired from the recording medium.

11. A method of controlling an information processing apparatus having a communication unit configured to receive data from a recording medium, the method comprising:
- a decision step for deciding whether a recording medium comprises a wireless communication unit; and
- a control step for controlling a save destination of data received by the communication unit from the recording medium,
- wherein in the control step, in a case where it is decided that the recording medium does not comprise the wireless communication unit in the decision step, data of which the communication unit receives from the recording medium without using the wireless communication unit is stored in a pre-determined first save destination, and
- in a case where, in said decision step, it is decided that the recording medium comprises the wireless communication unit, information of a second save destination, which is different from the first save destination, for storing data transmitted by the wireless communication unit is acquired from the recording medium, and data of which the communication unit receives from the recording medium without using the wireless communication unit is stored in the second save destination, not the first save destination.

\* \* \* \* \*